May 27, 1952 N. L. CAHNERS ET AL 2,598,222
MATERIALS HANDLING APPARATUS
Filed March 14, 1947 4 Sheets-Sheet 1
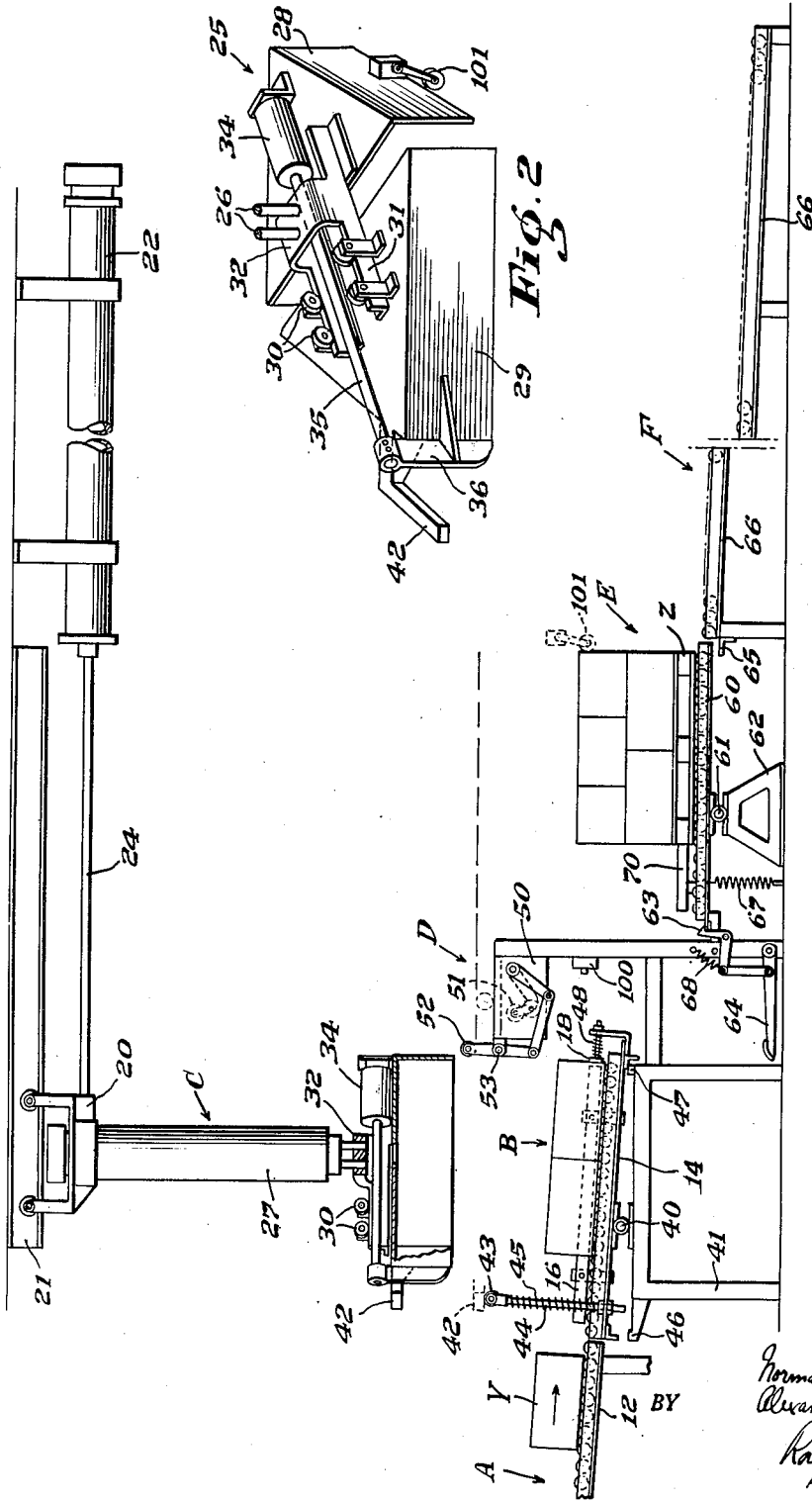
INVENTORS
Norman L. Cahners
Alexander W. Moffat
Rowland V. Patrick
ATTORNEY

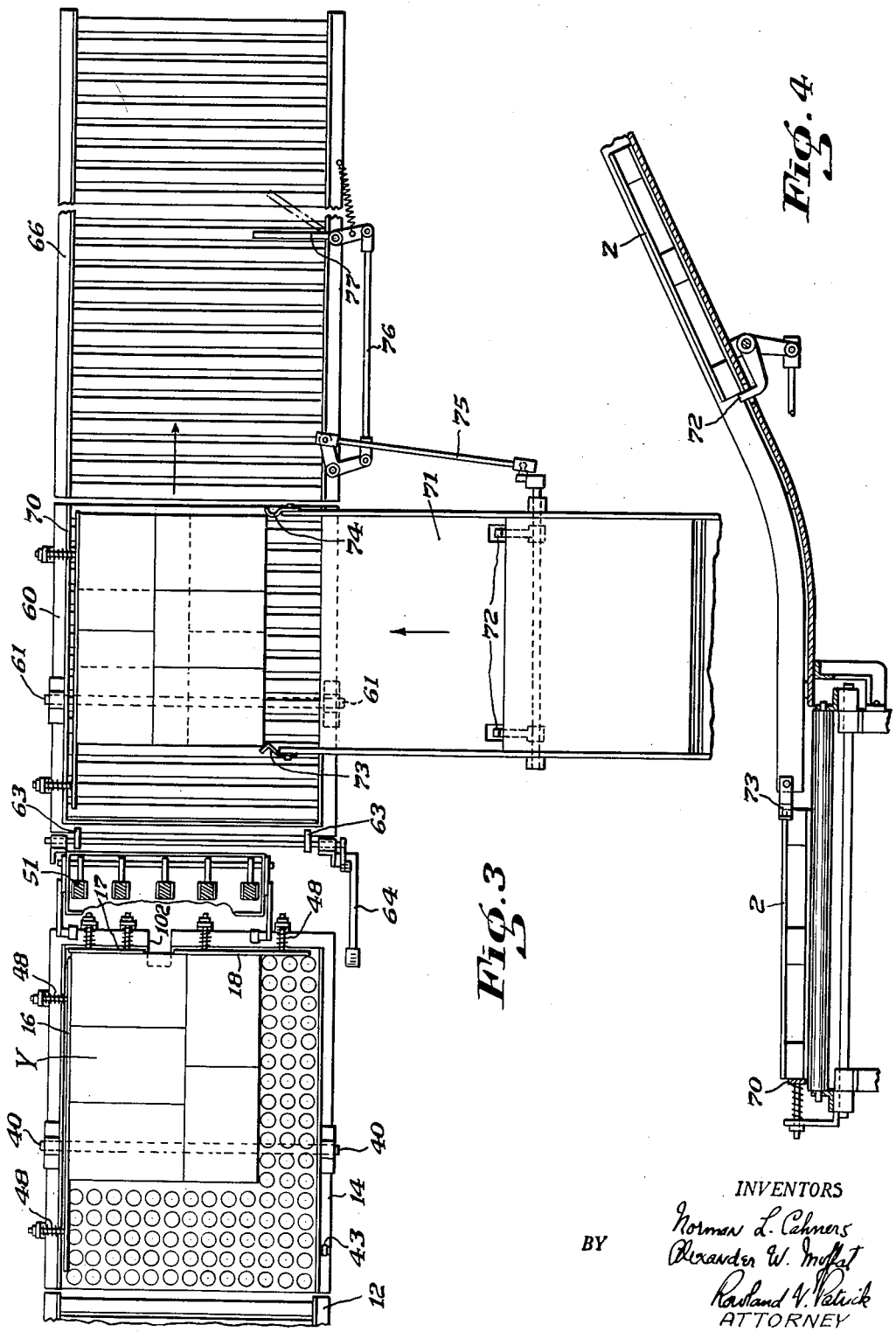

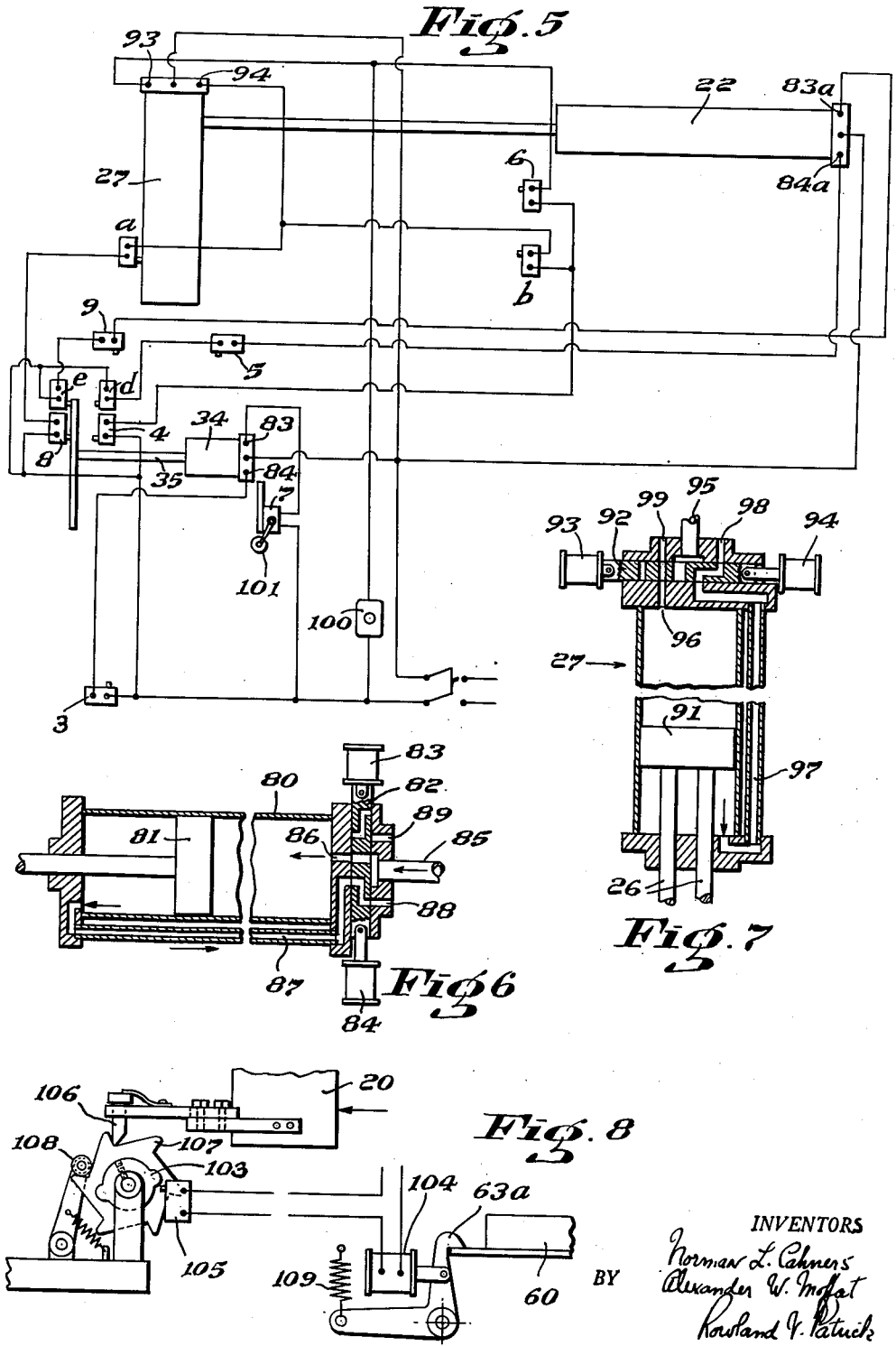

May 27, 1952   N. L. CAHNERS ET AL   2,598,222
MATERIALS HANDLING APPARATUS
Filed March 14, 1947   4 Sheets-Sheet 4

INVENTORS
Norman L. Cahners
Alexander W. Moffat
BY Rowland V. Patrick
ATTORNEY

Patented May 27, 1952

2,598,222

UNITED STATES PATENT OFFICE 2,598,222

MATERIALS HANDLING APPARATUS

Norman L. Cahners, Newton, and Alexander W. Moffat, Boston, Mass., assignors of one-half to said Cahners and one-half to Materials Handling Laboratories, Inc., Boston, Mass., a corporation of Massachusetts Application March 14, 1947, Serial No. 734,590

13 Claims. (Cl. 214—6)

This invention relates to materials handling apparatus and particularly to apparatus for loading individual cartons or other parcels to be transported into a unit load, as on a portable lift truck platform.

The invention has for a main object the provision of apparatus for moving successively single tiers of units assembled in side by side patterned relation at an assembling station and depositing them one on top of another at a loading station, as on a portable lift truck platform. Further objects of the invention include the provision in the apparatus of mechanism for removing a platform from the loading station after it is loaded; for applying adhesive to the bottoms of the units during their transit between the assembling and loading stations; for feeding empty platforms to the loading station; and for supplementing the compressive strength of the platforms while being loaded. Controls are provided for automatically actuating the mechanisms whereby units, which may be rapidly assembled at the assembly station from an infeeding conveyor, are automatically discharged from the other end of the apparatus in adhesively-secured unit loads stacked on platforms ready for lift truck handling. The term "platforms" is herein used to include generically skids and pallets.

Apparatus of this invention supplies semi-automatic platform loading, the only manual operations being those of directing the units into patterned relation in each single tier and of operating control mechanisms. Located at the end of a packaging conveyor, the apparatus can be handled by a single individual without any manual lifting and will rapidly load platforms.

Apparatus of the invention is shown in the accompanying drawings wherein Fig. 1 is a side elevation of the apparatus with certain parts broken away into cross-sectional views;

Fig. 2 is a perspective detail of the grab mechanism;

Fig. 3 is a plan of the lower portion of the apparatus showing certain units thereon;

Fig. 4 is an enlarged vertical cross-sectional detail of the platform feeding apparatus;

Fig. 5 is a circuit lay-out for a preferred electrical control system for the apparatus of Figs. 1-3;

Fig. 6 is a cross sectional detail of one of the motors;

Fig. 7 is a cross-sectional detail of another of the motors;

Fig. 8 is a diagrammatic elevational view of a modified control system for the discharge apparatus;

Fig. 1 shows an infeed conveyor designated A, an assembling station designated generally at B, an overhead conveyor designated generally at C, an adhesive-applying mechanism designated generally at D, a loading station designated generally at E, and a discharge conveyor designated generally at F, broken away to indicate extent.

Figure 9:
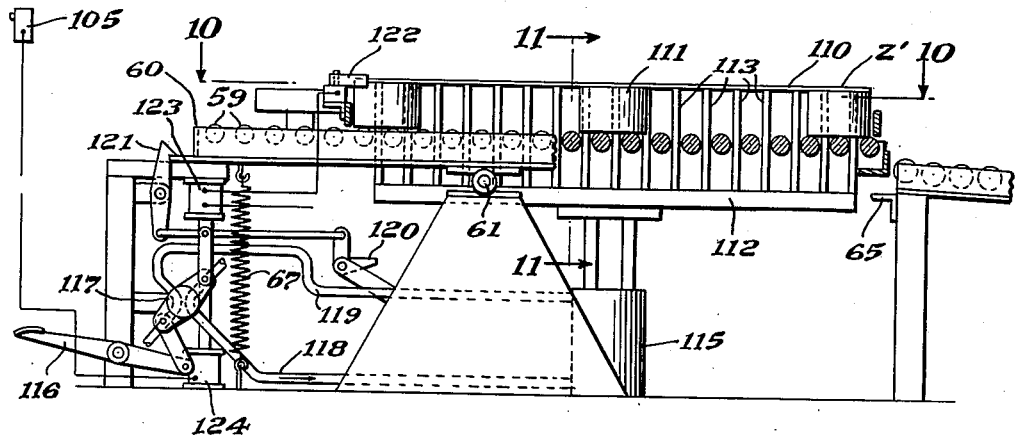
Fig. 9 is a cross-sectional view of a modified loading station construction showing a platform positioned thereon.

The infeed conveyor A is shown as a conventional gravity roller conveyor 12 discharging onto a ball table 14 tilted to lie in the plane of and flush against the gravity conveyor 12. Units Y, advancing down roller conveyor 12 in single file, thus pass onto the table 14 and can be hand-guided laterally of the table and with respect to the particular direction they face to form a patterned tier, as shown in Fig. 3, snug against a side guide rail 16 and a pair of spaced but alined end guide rails 17 and 18.

As shown in Fig. 3, three of the units Y lie transversely of the table and two longitudinally thereof to form an overall rectangular tier comprising five units Y.

Overhead conveyor C is adapted to grab such an assembled tier and lift it off the ball table 14. The conveyor C includes a carriage 20 suitably suspended from an overhead rail 21, with respect to which it has reciprocating rectilinear motion as imparted by air motor 22 to which it is connected by horizontally extending rod 24.

A lift grab 25, shown in detail in Fig. 2, is suspended from carriage 20 on vertically reciprocating elements 26 of an air motor 27 for up-and-down motion over and relative to the assembling station B when the carriage 20 is at the left hand limit of its horizontal travel.

The lift grab 25 is shown as a diagonally split inverted box-like device, one section 28 of which is fixed relative to elements 26, and the other section 29 of which is mounted for reciprocating motion towards and away from element 28 by suspension from rollers 30 supported on tracks 31 forming part of bracket 32 fast on elements 26. Relative motion between sections 28 and 29 is imparted by a motor 34 carried by section 28 and having a shaft 35 anchored to a bracket 36 fast on section 29.

Section 29 of grab 25 may thus move towards and away from section 28 to expand or contract the internal dimensions of the grab.

Since ball table 14 at station B is inclined, whereas grab 25 moves in a vertical path, table 14 is mounted on trunnions 40 for tilting movement relative to frame 41 from inclined position shown in Fig. 1 to a horizontal position. Such movement is imparted by relative contact of an extension 42 carried by grab 25 with a roller abutment 43 extending into the path of movement of extension 42 as grab 25 moves to the lower limit of its vertical path of movement. Roller 43 is carried at the end of a rod 44 passing loosely through table 14 but held in extended position relative thereto by the interposition of a spring 45 seated against table 14. As the grab 25 descends, therefore, extension 42 contacting roller 43 causes table 14 to pivot on its trunnions 40 to a horizontal position against a stop 46 on frame 41. Grab 25 then continues its movement squarely down over the tier of units Y. As grab 25 and extension 42 ascend, table 14 restores itself to inclined position against stop 47 by reason of the offset relation of the trunnions 40 to the table's center of gravity. The trunnions should be so placed that a single box passing over the entering end of the table during assembling will not tilt the table 14.

Grab 25, in descending over station B, is open, i. e., section 29 is in a position relatively remote to section 28. By reason of the relation of the path of descent of grab 25 to the guides 16, 17, 18, the side walls of section 28 clear the boxes Y. The limit of descent is controlled so that lower edges of sections 28 and 29 do not reach the upper edges of guides 16, 17, 18, whereby, through actuation of motor 34 the section 29 may be moved against two sides of the tier and jam the tier by diagonal movement over ball table 14 against the opposing sides of section 28. For this purpose, guides 16, 17, 18 must be yieldably mounted, as shown, for outward movement relative to table 14 when the clamping by grab lift 25 takes place. As soon as the tier is picked off the table 14 by the lift 25, springs 48 restore the guides to normal assembling position.

Grab 25 is shown in Fig. 1 at the upper limit of its vertical travel and at the left hand limit of its horizontal travel. A tier of boxes Y carried by the grab 25 will extend well below its side walls, for example, to the level of the broken line of Fig. 1. Accordingly, an adhesive-applying mechanism D is provided which includes a tank 50 mounted on frame 41, and having submerged therein, below the level of a liquid adhesive, a row of rollers 51 connected by suitable linkages to a roller 52 which extends into the path of travel of a tier of boxes Y being carried by conveyor C. As carriage 20 travels to the right, therefore, as shown in Fig. 1, roller 52 will be pivoted about fulcrum 53 to raise rollers 51 out of the adhesive against the bottoms of boxes Y to apply stripes of adhesive thereto. As soon as the boxes pass beyond the path of roller 52, the rollers 51 are restored by gravity to their submerged position.

Loading station E comprises a section 60 of a roller conveyor mounted on trunnions 61 and supported by a frame 62 and held at a horizontal level by latches 63 connected to a foot treadle 64.

As shown, the section 60 acts as a table to hold a pallet Z on which boxes Y are to be loaded in tiers as shown. When latches 63 are released by treadle 64, section 60 tilts against a stop 65 into the plane of an inclined gravity discharge roller conveyor 66 to discharge the loaded pallet Z off the table and down the conveyor.

Springs 67 and 68 are provided to restore section 60, latches 63 and connecting parts to the positions of Fig. 1 after the loaded pallet Z has been discharged.

Fig. 3 shows apparatus for automatically feeding a new pallet Z to loading station E responsive to discharge of a loaded pallet down conveyor 66. For this purpose, section 60 is provided with a stop rail 70 and an infeed chute 71 is positioned opposite thereto. Mounted for movement into the path of travel of a pallet Z on chute 71 are stops 72, and the end of the chute is provided with light springs 73 and 74 to prevent jumpback. Stops 72 normally hold a pallet as shown in Fig. 4, but are connected by suitable linkages 75, 76, etc. to a dog 77 extending into the path of movement of a loaded pallet Z being discharged down conveyor 66. Movement of the dog by the discharged pallet moves stops 72 downwardly to release the new pallet Z which moves by gravity down chute 71 onto the loading station table 60. Spring 74 should be heavy enough to prevent kick-back of the empty pallet but not prevent discharge of the loaded pallet Z.

Proper operation of grab 25 is dependent upon use of properly controlled motors 22, 27 and 34, hereafter respectively referred to as the travel motor, the hoist motor and the clamp motor.

Fig. 6 shows the general construction of a suitable solenoid-operated two-way air motor useful for the travel and clamp motors. Cylinder 80, containing piston 81, has communication at each end with a sliding valve 82 operated in one direction by solenoid 83 and in the other direction by solenoid 84. In the position shown, communication is established from the air pressure line 85 to one end of the cylinder chamber through valve 82 and port 86 to drive piston 81 to the left. The other end of the cylinder chamber is simultaneously in communication with the atmosphere through port 87, valve 82 and port 88. Shift of valve 82 by energizing solenoid 84 causes reverse drive of piston 81, through communication of the air pressure line 85 through valve 82 and port 87 with the other end of the cylinder chamber. Simultaneously, port 86 is in communication with the atmosphere through valve 82 and port 89.

The hoist motor 27, on the contrary, is a one-way motor as shown in Fig. 7. The valve 92 in the position shown in Fig. 7 establishes communication between the lower portion of the cylinder chamber through port 97, valve 92 and port 98 to the atmosphere. Simultaneously the upper portion of the chamber is likewise in communication with the atmosphere through port 96, valve 92 and port 99. Because of the weight of the lift 25, piston 91 will descend, it being understood that a suitable bleed valve may be interposed in the port 98 to control the speed of descent.

Shift of the valve 92 by energizing solenoid 94 will cause port 97 to be brought into communication with air pressure inlet 95. Meanwhile, port 96 remains in communication with the atmosphere. Piston 91 will then be driven upwardly.

It should be understood that suitable bleed valves or intake control valves may be interposed in one or more of the ports 88, 89 of the travel or clamp motors and port 99 of the hoist motor to control the speed and rate of acceleration or deceleration of the pistons.

The solenoids of the motors are energized in cyclical relation by the micro-switch system shown in Fig. 5, based upon a dwell of the grab at the position shown in Fig. 1 and with a cycle comprising the following sequence:

a. Grab 25 descends at left with clamp in extended position.
b. Clamp of grab 25 is closed.
c. Grab 25 ascends with a grabbed tier.
d. Carriage 20 travels to its right limit.
e. Grab 25 descends to loading station E.
f. Clamp of grab 25 opens to release the tier.
g. Grab 25 ascends.
h. Carriage 20 travels to its original left limit dwell position.

All of the micro-switches except $a$ and $b$ are normally closed. The switches $a$, $b$ and 6 are actuated at predetermined points in the horizontal travel of and by carriage 20; switches 3, 5, 7 and 9 are actuated at predetermined points in the vertical travel of and by grab 25; and switches $c$, $d$, 4 and 8 are actuated at predetermined points in the travel of and by section 29 of the clamp.

Tracing the cycle through the circuits of Fig. 5:

Step $a$ is accomplished by momentarily closing a switch 100 to energize solenoid 93 to shift hoist motor valve 92 to the position of Fig. 7, permitting air to exhaust from the lower portion of motor 27 through ports 97 and 98. The grab descends.

Step $b$ is accomplished by providing a normally open micro-switch 3, fixedly mounted relative to the assembling station table 14 and actuated upon descent of the lift 25 to a proper level to energize solenoid 84 of clamp motor 34 to shift valve 82 from the position thereof shown in Fig. 6 to close the clamp.

Step $c$ is accomplished by providing a normally open micro-switch 4 in a position to be closed by the travel of the clamp to closed position to energize solenoid 94 of hoist motor 27 through a normally closed micro-switch $b$. The movement of the clamp to closed position opens switch 8 and switch $c$ and closes switches 4 and $d$.

Step $d$ is accomplished by the provision of a micro-switch 5 closed at the upper limit travel of the grab 25 to energize solenoid 84a of the travel motor 22 to cause the carriage to travel to the right. Switch 9, although closed, is still in an open circuit because switch $c$ is open. By closing switch 5, a circuit is made through closed switch $d$ to solenoid 84a.

Step $e$ is accomplished by the provision of a micro-switch 6 which is closed as the carriage 20 reaches the right-hand limit of its travel to energize solenoid 93 of motor 27 to bring valve 92 to the position shown in Fig. 7 and permit descent of the grab 25. The circuit to solenoid 93 is made through closed switch 4 and closed switch 6, the circuit to solenoid 94 being open because normally closed switch $b$ is opened simultaneously with the closing of switch 6 and switch 8 remains open.

Step $f$ is accomplished by the actuation of a roller dog 101 as it contacts a pallet Z or the top of a tier of boxes Y previously positioned on pallet Z to close a switch 7 to energize solenoid 83 of clamp motor 34 to bring the clamp motor valve to the position shown in Fig. 7 to cause the clamp to open.

Step $g$ is accomplished by the provision of switch 8 which is closed by the clamp travel to open position to energize solenoid 94 through now closed switch $a$ to cause hoist motor 27 to raise grab 25. Roller 101 returns to normal position as by a spring control (not shown) during this upward travel.

Step $h$ is accomplished by the closing of microswitch 9 as the grab 25 reaches the top of its vertical travel to energize through now closed switch $c$, solenoid 83a of travel motor 22 to move valve 82a to the position shown in Fig. 6 to cause carriage 20 to travel to the left. Switch 6 opening during this travel, the cycle will come to an end and will not recommence until switch 100 is again momentarily closed.

In order that micro-switch 7 will not be closed at the loading station portion of the cycle, guides 17 and 18, as shown in Fig. 3, define an aperture 102 for unhindered passage of the roller 101, it being understood that the position of the guides 17 and 18 at the moment of descent of the grab 25 is to the left of the vertical plane of the inside right-hand wall of section 28 of the descending clamp. The roller 101, will, therefore, have a descending movement in a vertical plane spaced to the right of the vertical plane of the side walls of the tier of boxes Y assembled on the table 14, so that the roller will clear the tier. The tier is moved against the right-hand wall of section 28 of the clamp only after the roller 101 has passed the side of the tier and is below the level of the ball table 14. In other words, the clamp pushes the tier in over the roller 101, so that, after clamping, the roller 101 extends across the vertical plane of the edge of the clamped tier and is in proper position for actuation at the loading station despite the fact that the tier being loaded will be vertically aligned with the pallet Z or any tier of boxes previously positioned on the pallet Z.

A complete cycle of operation of the apparatus is, therefore, as follows:

Pallet Z having been positioned at the loading station on conveyor section 60, which is in a horizontal position, and a series of boxes Y being continuously available one by one as they progress down gravity conveyor A, the operator manually guides each box Y as it passes onto the table 14 until she has assembled the correct number of boxes for one tier, for example, the five boxes shown in Fig. 3 in a predetermined desired pattern up against the guides 16, 17 and 18.

The operator then pushes the button of switch 100 which starts the electrical cycle. The grab descends. Cooperation of abutments 42 and 43 causes table 16 to pivot to horizontal position. The descending grab closes switch 3 (Fig. 5) which closes the grab, moving the tier against the yieldable guides 16, 17 and 18 into the corner of section 28 of the lift. Movement of clamp to closed position closes switch 4 causing the hoist motor 27 to lift the grab with its clamped tier. As the grab reaches the top of its vertical travel, it closes switch 5, actuating motor 22 to cause carriage 20 to travel to the right. During this travel the grabbed boxes strike roller 52 of the adhesive-applying mechanism, lifting rollers 51 into contact with the bottom of the tier. The rollers 51 thus coat the boxes with stripes of adhesive.

Upon reaching the right-hand limit of the carriage travel, hoist motor 27 is actuated to permit the grab to descend. There being no previous tier of boxes on the pallet Z, the grab will descend until roller 101 strikes the corner edge of pallet Z, whereupon the clamp will immediately open causing switch 8 to close, thereby actuating the hoist motor 27 to lift the grab. The grab will then automatically travel to the dwell position of Fig. 1, clearing the roller 52 because of the absence of any load.

Meanwhile, as the carriage was thus depositing the first tier, the table 14 at the loading station automatically returned to tilted position in readiness for assembly of a second tier in the same or a different pattern. For example, as indicated in Fig. 3 the pattern may be reversed on alternate tiers.

Upon completion of assembly of the second tier, the operator again pushes the button of switch 100 to cause travel of the second tier to the loading station. This time, clamp opening roller 101 will be actuated at a different level corresponding to the level of the top of the previously positioned tier.

Each tier as it is deposited at the loading station adheres itself either to the pallet Z or the previous tier because of the presence of adhesive on its bottom, applied during transit between stations B and E.

When the pallet has been loaded with the proper number of tiers (3 as shown in drawings), the operator steps on the treadle 64, with the result that the weight of the loaded pallet tilts the conveyor section 60, causing the loaded pallet to roll off under the influence of gravity onto the discharge conveyor 66.

As soon as the loaded pallet moves off to section 60, spring 67 causes section 60 to return to normal horizontal position and release of treadle 64 moves latches 63 into normal latching position.

Meanwhile, the loaded pallet as it descends down conveyor 66 trips dog 77, thereby actuating the stops 72 and releasing another pallet Z which slides down the inclined chute to a position on section 60 controlled by the stop rail 70, and jump-back preventing springs 73 and 74.

Fig. 8 shows a modification wherein the loading station conveyor section 60 is held by solenoid-actuated latches 63a. The solenoid 104 is energized by a switch 105 which is closed at the end of a predetermined number of cycles of the grab lift mechanism, shown in Fig. 8 as being three in number. The carriage 20 is provided with an extension, at the end of which is a spring-held pawl 106 which engages a ratchet wheel 107 and moves the wheel 60° with each left-hand transit of carriage 20. A spring-loaded roller lever 108 acts as a brake to prevent return movement of the wheel 107 as the spring-held pawl 106 passes to the right off of the wheel 107. The shaft carrying wheel 107 also carries a cam 103 having two diametrically opposed lobes. There being six teeth on wheel 107 and two lobes on cam 103, switch 105 will be closed momentarily near the close of every third cycle of the grab travel long enough to cause solenoid 104 to move latches 63a to unlatched position to release the conveyor section 60 for movement to tilting discharge position. Spring 109 is provided to return the latches to latching position. By providing a different number of teeth on wheel 107, the discharge mechanism may be actuated after any predetermined number of grab lift cycles.

Figure 10:
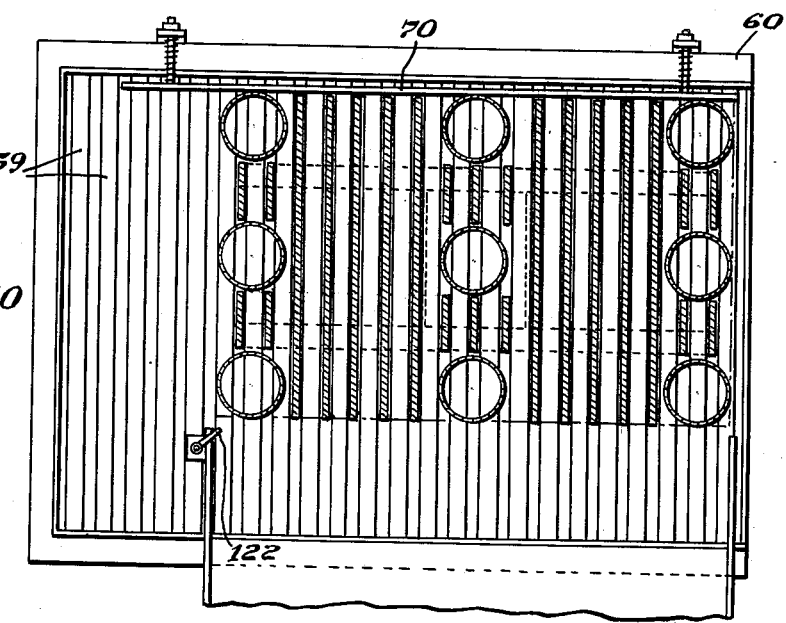
Fig. 10 is a cross-sectional view taken along the line 10—10 of Fig. 9.
Figure 11:
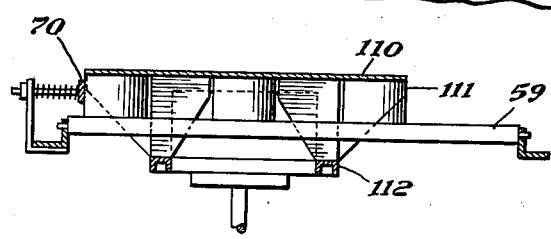
Fig. 11 is a cross-sectional view taken along the line 11—11 of Fig. 9.

Figs. 9, 10 and 11 illustrate the addition to the loading station E of a device for providing support beneath the spans of a platform $Z^1$ during the loading operation, together with a modified form of control mechanism.

The additional apparatus comprises a retractable grid, particularly adapted for use with an expendable platform of the type shown and described in Cahners application, Serial No. 661,556, filed April 12, 1946 now U. S. Patent No. 2,444,184, issued June 29, 1948. Such a platform $Z^1$ includes a paperboard sheet 110 having nine tubular supporting members 111 spaced beneath the platform. The members 111 form supporting legs or feet, but, in some cases, during loading, the intervening spans of the platform 110 require support during loading until the total load is unified. Such a support is provided in Figs. 9, 10 and 11 and comprises a grid 112 mounted for reciprocating vertical motion, the grid members 113 extending upwardly between and above the rolls 59 of the conveyor section 60 a distance substantially equal to the height of the feet 111 so as to bear against the bottom side of platform sheet 110 between feet 111.

In order that platform $Z^1$, when loaded, can be discharged from the table 60 in the same manner as that described with the previous figures, it is necessary that the grid 112 be retracted below the top level of the rollers 59 to lower the grid members 113 out of the path of discharge movement of the feet 111. This is accomplished by a two-way air motor 115. The air motor 115 is actuated to cause retraction of the grid 112 through treadle 116, which operates a four-way valve 117. In the position shown in Fig. 9 air is being admitted to the cylinder of motor 115 through line 118, line 119 being open to the atmosphere. Upon stepping on the treadle, the valve will reverse the condition in lines 118 and 119 causing the grid to lower. If the grid lowers, it hits a dog 120 which releases latches 121 retaining the table in horizontal position, thereby permitting the load to pivot the table on its trunnions 61. The platform $Z^1$ is then discharged from the table 60 and operates the dog 77 as in Fig. 3. This results in delivery of another platform $Z^1$ to the table 60 and during its delivery, it trips a dog 122 which energizes a solenoid 123 to return valve 117 to its original position admitting air to line 118 and causing a rise of the grid 112 to original supporting position beneath the new platform. If desired, a second solenoid 124 may be provided for valve 117 to be energized by the closing of the switch 105 described in connection with Fig. 8, the solenoid 124 and associated mechanisms of Fig. 9 being substituted for the solenoid 104 and associated mechanism of Fig. 8.

We claim:

1. Materials handling apparatus for loading a multiplicity of individual units into a composite load, comprising a table forming an assembling station adapted to support repeatedly a multiplicity of units in side by side patterned relation forming a tier supported at a predetermined position on said table, an adjacent support forming a loading station, a movable grab lift having relatively movable jaws and having a path of movement of inverted U-shape between said assembling station and said loading station, the legs of the U respectively overlying said stations, said grab being adapted at the assembling station end of said path to grab a single tier of said side by side units assembled on said table and at the other end section of said path to release said tier, and power mechanism for cyclically moving said grab back and forth along said path to lift and move successively single tiers of said side by side units from said assembling station and carry the single tiers to said loading station for deposit one on top of another in fixed vertically aligned relationship with said loading station support.

2. Materials handling apparatus as claimed in claim 1 in which said power mechanism for cyclically moving said grab includes control means having movable contacts fixedly mounted adjacent the path of travel of said grab and actuated by the movement of said grab whereby the grab is cyclically lifted away from said assembling station, moved to the loading station and returned to a dwell position between said assembling station and said loading station.

3. Materials handling apparatus as claimed in claim 1, having control means for cyclically operating said grab at said assembly station end section of said path of movement to grab singly successively assembled tiers and control means at the loading station end responsive to the level of loading at the station for depositing said tiers at the loading station at successively higher levels to load said tiers one on top of another.

4. Materials handling apparatus as claimed in claim 3, wherein the control means at the loading station end is mounted on said lift and is operated in one cycle responsive to the level of a loading platform positioned on said loading station support by movement into contact with said platform, and in successive following cycles responsive to the top level of the tier deposited at the loading station in the immediately preceding cycle by movement into contact with a unit in said previously deposited tier.

5. Materials handling apparatus as claimed in claim 1, wherein the loading station support is a conveyor, said apparatus including driving means for said conveyor, and having control means mounted in the path of said lift for actuating said drive means, said control means incorporating a counting device for actuating said drive means only in certain cycles of said lift to discharge units from said loading station only after a multiplicity of tiers have been stacked at said loading station in a plurality of cycles of said grab.

6. Materials handling apparatus as claimed in claim 1, wherein the loading station support is a roller conveyor, said conveyor being journalled for tilting movement from a horizontal loading position to a tilted discharging position to discharge from said loading station a multiplicity of tiers stacked at said loading station by said grab.

7. Materials handling apparatus comprising an infeed conveyor, a frame, a normally inclined table movably mounted on said frame adjacent the discharge end of said infeed conveyor and adapted to receive units fed by said conveyor for positioning thereon in side by side pattern relation forming a tier of units, said table being movable about an axis from its normally inclined position to horizontal position against the influence of gravity, a grab lift movable downwardly over said table for grabbing and removing an assembled tier, power means for vertically moving said lift, and an abutment on said lift and movable into contact with said table as said lift descends to move said table to horizontal position against the influence of gravity, said table moving to its normal inclined position under the influence of gravity as said lift ascends and moves said abutment out of contact with the table.

8. Materials handling apparatus for loading a multiplicity of individual units into a composite load, including an assembling station, a loading station, a grab lift having relatively movable jaws adapted to close to grasp a single tier of individual units at the assembling station and release said tier at the loading station, grab lifting and translating means including movable contacts adjacent to the path of travel of said grab whereby the jaws of said grab are closed at the assembling station to pick up a single tier of individual units, move said grab to the loading station and return to a dwell position, and control means responsive to the level of loading at the loading station for depositing said tiers at the loading station to successively higher levels to load said tiers one on top of another comprising a movable contact on said grab lift extending below a single tier of units grasped by the grab lift and actuated by the level of loading at the loading station to open said jaws to release the single tier of individual units in fixed vertically aligned relationship with said loading station.

9. Materials handling apparatus comprising a support for receiving units in side by side patterned relation forming a tier, guides on said support for retaining said tier in fixed overall relationship thereto, said guides being yieldably retractible, a grab lift movable downwardly over a tier supported on said table and clamping elements on said lift for moving said tier over said table against the yielding pressure of said guides into clamped relation to said lift.

10. In materials handling apparatus for loading a multiplicity of individual units into a composite load, a series of spaced supports forming a broken surface table for supporting spaced feet of uniform height adapted to support the load, a grid movable relative to said table from a position extending above the plane of said broken surface a distance substantially equal to the height of said feet to give support to said load between said feet during loading, to a lower non-supporting position and mechanical means for advancing said grid to and retracting said grid from supporting position relative to said table to permit said load to be discharged from said table after completion of loading.

11. Materials handling apparatus comprising a conveyor adapted to support a multi-foot platform in load-receiving position, a grab lift for cyclically delivering units in tiers to said loading station and depositing them successively one on top of another on said platform, a retractible temporary support at said loading station movable into position to support the spans of the platform between its feet during loading, and control means for sequentially retracting said temporary support from said spans and then actuating said conveyor to discharge the loaded platform from load-receiving position.

12. Materials handling apparatus as claimed in claim 11, having a magazine for empty platforms, a chute for delivering empty platforms from said magazine to load-receiving position on said conveyor, a movable stop for holding an empty platform on said magazine and control means for moving said stop responsive to discharge of a loaded platform along said conveyor to release an empty platform from said magazine, and control means responsive to arrival of said empty platform in load-receiving position for returning said retractible support to span-supporting position.

13. Materials handling apparatus as claimed in claim 12, wherein the temporary support control means is actuated to retract said support responsive to the travel of the grab lift away from said loading station in certain only of its cycles.

NORMAN L. CAHNERS.
ALEXANDER W. MOFFAT.

REFERENCES CITED

The following references are of record in the file of this patent:

UNITED STATES PATENTS

| Number | Name | Date |
|---|---|---|
| 878,797 | Harding et al. | Feb. 11, 1908 |
| 1,083,494 | Johnson | Jan. 6, 1914 |
| 1,352,947 | Fiske | Sept. 14, 1920 |
| 1,490,235 | Smith et al. | Apr. 15, 1924 |
| 1,565,840 | Wise | Dec. 15, 1925 |
| 1,694,084 | Straight | Dec. 4, 1928 |
| 1,778,267 | McArthur | Oct. 14, 1930 |
| 1,820,674 | Olson | Aug. 25, 1931 |
| 1,870,207 | Washburne | Aug. 2, 1932 |
| 1,904,720 | Douglass | Apr. 18, 1933 |
| 1,926,060 | Peters | Sept. 12, 1933 |
| 2,060,616 | Fleischer et al. | Nov. 10, 1936 |
| 2,065,674 | Fay | Dec. 29, 1936 |
| 2,191,143 | Hiatt et al. | Feb. 20, 1940 |
| 2,228,887 | Peterson | Jan. 14, 1941 |
| 2,253,283 | Minaker | Aug. 19, 1941 |
| 2,431,320 | Fischer | Nov. 25, 1947 |